Feb. 5, 1929.
W. J. McGARVEY
1,701,384
COOKING VESSEL
Filed Jan. 10, 1928
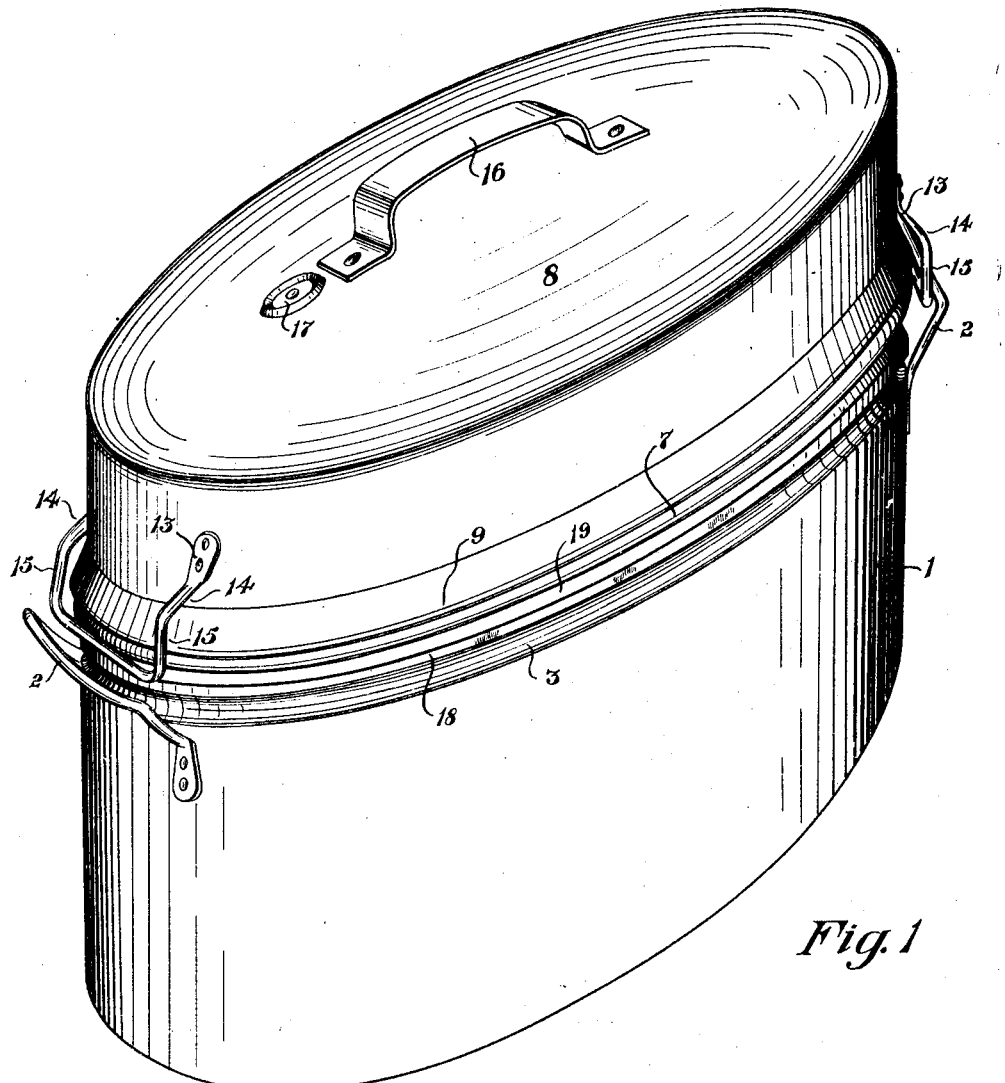
Fig. 1
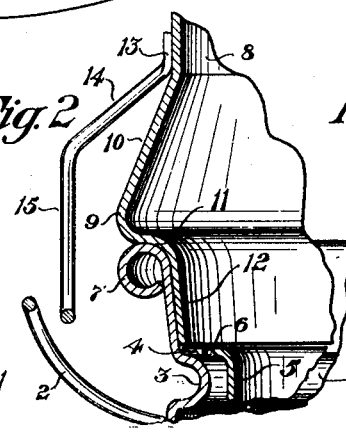 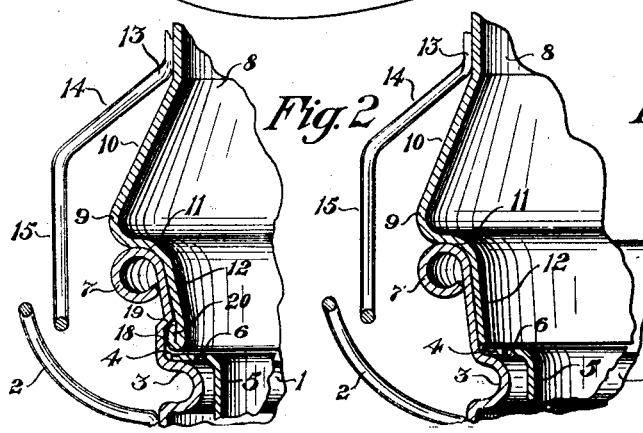
Inventor
W. J. McGarvey
By Frease and Bond
Attorneys Patented Feb. 5, 1929.

1,701,384

UNITED STATES PATENT OFFICE.

WILLIAM J. McGARVEY, OF WOOSTER, OHIO, ASSIGNOR TO THE BUCKEYE ALUMINUM COMPANY, OF WOOSTER, OHIO, A CORPORATION OF OHIO.

COOKING VESSEL.

Application filed January 10, 1928. Serial No. 245,646.

The invention relates to cooking vessels of that type provided with a steam-tight cover whereby a heat retaining compartment is provided in which the food may be cooked in its own juices without the addition of water.

In recent years cooking vessels have come into general use in which the vessel is adapted to be placed upon a base or the like located over a stove burner or flame, a steam-tight cover being provided for the vessel and having a number of clamps for tightly clamping the same upon the vessel in order to form a heat retaining compartment within the vessel to prevent the escape of the vapors and steam from the cooking food.

Food cooked in such cooking vessels retains all of its natural flavor since the food is steamed in the vapors generated from its own juices, without the addition of water.

However, in order to provide for a steam-tight cover, it has been customary to place a number of clamps upon the cover adapted to engage a bead or rim or the like upon the body of the cooking vessel.

It has been found by experience that such clamps are objectionable as they are cumbersome and require time and work to clamp and unclamp the same when placing the cover upon the vessel and removing the same therefrom, either to inspect the cooking food or to remove the food from the vessel when cooked.

The object of the present improvement is to provide a cooking vessel of the general character referred to, having a steam-tight cover arranged to be quickly and easily placed upon the vessel or removed therefrom without the necessity of using any clamps or the like for holding the cover upon the vessel.

The above and other objects may be attained by providing a cooking utensil, preferably of oval shape having a strengthening bead surrounding its upper open edge, the cover having a peripheral rib adapted to rest upon said bead and terminating in a depending flange adapted to snugly fit within the upper open end of the vessel.

The upper open end of the vessel may be flared slightly outward and the depending flange of the cover may be correspondingly tapered and if desired, a projection may be formed at the lower edge of this flange as by bending the same outward and upward upon itself, and a peripheral recess may be formed in the vessel for receiving said projection in order to prevent accidental displacement of the cover when the same is in position upon the vessel.

An internally disposed rib may be formed in the vessel below the depending flange of the cover to support an inner container or inset such as is used with cookers of this general type.

An embodiment of the invention is illustrated in the accompanying drawing, in which Figure 1 is a perspective view of the improved cooking vessel;

Fig. 2, an enlarged fragmentary sectional view through the upper end portion of the vessel and the corresponding portion of the cover; and Fig. 3, a similar view of a modified form of the invention.

Similar numerals refer to similar parts throughout the drawing.

The cooking vessel 1 may be formed of sheet metal such as aluminum or the like, preferably of oval shape and provided at its ends with the upwardly disposed handles 2 by means of which the vessel may be placed upon or removed from the usual base upon which such cookers are placed when in use.

The vessel 1 may be provided, at a point spaced below its upper open end, with an internal rib 3 for supporting the outturned flange 4 of an inner vessel or container 5 of any usual and well known construction.

This flange 4 of the container may be provided with perforations 6 whereby steam may pass upward through the same to assist in the cooking of food in the container 5.

The metal at the upper open end of the vessel 1 is preferably rolled into an outturned bead 7 for strengthening and reinforcing the vessel at this point.

The cover 8 is also of oval shape corresponding to the shape of the vessel and is provided with the outwardly disposed peripheral rib 9 preferably formed by bending the metal downward and outward at an angle as at 10 and then curving the same inward and downward to fit snugly upon the bead 7 as shown at 11, terminating in the depending flange 12 adapted to snugly fit within the upper open end of the vessel between the bead 7 and rib 3.

For the purpose of easily placing the cover upon the vessel and removing it therefrom, the upper portion of the vessel, between the rib 3 and bead 7, may be slightly flared outward and the depending flange 12 of the cover may be correspondingly inclined as illustrated.

Handles 13 may be provided at the ends of the cover, preferably being inclined downward and outward as at 14 and then bent substantially straight downward as at 15 and adapted to be located between the handles 2 and the vessel as best illustrated in Figs. 2 and 3.

When it is desired to remove the cover, it is only necessary to insert a knife or the like downward over the top of one of the handles 2 and underneath the adjacent cover handle 13, using the knife as a lever to raise the cover and disengage the same from the vessel.

A handle 16, of usual construction, may be provided upon the top of the cover for moving the same from place to place and the usual valve 17 may be provided in the cover for permitting the escape of steam when the same exceeds the desired pressure.

As shown in Figs. 1 and 2, a peripheral recess 18 may be formed in the vessel above the rib 3, preferably having the inclined shoulder 19 at its upper edge and the lower edge of the depending flange 12 of the cover may be bent outward and upward upon itself as at 20, and adapted to seat within said recess in order to more securely hold the cover in place upon the vessel.

It will be seen that the cover may be easily placed upon the vessel by pressing the same downward until the upturned end portion 20 of the cover flange springs within the recess 18 and at the same time the cover may be easily removed as the inclined shoulder 19 of the recess 18 will permit this upturned edge portion of the flange to ride out of the recess when an upward pull is exerted upon the cover as above described.

It should be understood that instead of turning the lower end portion of the flange outward and upward to form a rib at the lower edge of the cover flange, any other form of rib may be placed around the lower end of this flange to accomplish the same result.

From the above, it will be seen that a cooking vessel is provided with a steam-tight cover which may be easily and readily placed upon or removed from the vessel and securely held in place without the use of cumbersome clamps or the like.

I claim:

1. A cooking vessel having a bead at its upper open end and a cover for said vessel having an outwardly and downwardly disposed peripheral rim provided with a concave under portion for seating upon said bead and a depending inwardly inclined flange for frictionally engaging within the upper open end portion of the vessel.

2. A cooking vessel having a bead at its upper open end and a cover for said vessel having an outwardly and downwardly disposed peripheral rim provided with a concave under portion for seating upon said bead and a depending flange for closely engaging within the upper open end portion of the vessel, the upper portion of the vessel being upwardly and outwardly flared and the depending flange upon the cover being correspondingly inclined.

3. A cooking vessel having a bead at its upper open end and a cover for said vessel having an outwardly and downwardly disposed peripheral rim provided with a concave under portion for seating upon said bead, a depending inwardly inclined flange for closely engaging within the upper open end portion of the vessel, a peripheral recess formed in the vessel at a point spaced below the bead and a peripheral rib upon the cover flange for engagement in said recess.

4. A cooking vessel having a bead at its upper open end and a cover for said vessel having an outwardly disposed peripheral rim provided with a concave under portion for seating upon said bead, a depending flange for closely engaging within the upper open end portion of the vessel, a peripheral recess formed in the vessel at a point spaced below the bead and a peripheral rib upon the cover flange for engagement in said recess, an inclined shoulder being provided at the upper edge of said recess.

In testimony that I claim the above, I have hereunto subscribed my name.

WILLIAM J. McGARVEY.